United States Patent
Ozawa et al.

(10) Patent No.: US 9,837,116 B2
(45) Date of Patent: Dec. 5, 2017

(54) MAGNETIC TAPE AND MAGNETIC TAPE DEVICE

(71) Applicant: FUJIFILM Corporation, Tokyo (JP)

(72) Inventors: Eiki Ozawa, Minami-ashigara (JP); Tetsuya Kaneko, Minami-ashigara (JP); Norihito Kasada, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/466,143

(22) Filed: Mar. 22, 2017

(65) Prior Publication Data

US 2017/0278540 A1  Sep. 28, 2017

(30) Foreign Application Priority Data

Mar. 23, 2016 (JP) .................................. 2016-057866

(51) Int. Cl.
  *G11B 5/09*  (2006.01)
  *G11B 20/12*  (2006.01)
  *G11B 5/008*  (2006.01)

(52) U.S. Cl.
  CPC ...... *G11B 20/1201* (2013.01); *G11B 5/00813* (2013.01)

(58) Field of Classification Search
  None
  See application file for complete search history.

(56) References Cited

U.S. PATENT DOCUMENTS

| | | | |
|---|---|---|---|
| 6,207,252 B1* | 3/2001 | Shimomura | G11B 5/70 428/141 |
| 6,228,461 B1* | 5/2001 | Sueki | G11B 5/7305 360/134 |
| 7,255,908 B2* | 8/2007 | Ishikawa | G11B 5/584 428/141 |
| 7,803,471 B1* | 9/2010 | Ota | G11B 5/735 428/845.6 |
| 8,535,817 B2 | 9/2013 | Imaoka | |
| 9,311,946 B2 | 4/2016 | Tanaka et al. | |
| 2003/0059649 A1* | 3/2003 | Saliba | B82Y 10/00 428/843 |
| 2003/0091866 A1* | 5/2003 | Ejiri | G11B 5/70 428/818 |
| 2011/0052908 A1 | 3/2011 | Imaoka | |
| 2012/0045664 A1 | 2/2012 | Tanaka et al. | |
| 2016/0180875 A1 | 6/2016 | Tanaka et al. | |

FOREIGN PATENT DOCUMENTS

| | | |
|---|---|---|
| JP | 2011-048878 A | 3/2011 |
| JP | 2012-043495 A | 3/2012 |

* cited by examiner

*Primary Examiner* — Peter Vincent Agustin
(74) *Attorney, Agent, or Firm* — Sughrue Mion, PLLC (57) ABSTRACT

The magnetic tape has a timing base servo pattern on the magnetic layer, wherein the centerline average surface roughness Ra on the surface of the magnetic layer is less than or equal to 1.8 nm, the magnetic layer contains a fatty acid ester, the full width at half maximum of spacing distribution measured by optical interferometry on the surface of the magnetic layer before and after vacuum heating the magnetic tape is greater than 0 nm but less than or equal to 7.0 nm, the difference of spacing measured by optical interferometry on the surface of the magnetic layer after and before vacuum heating the magnetic tape is greater than 0 nm but less than or equal to 8.0 nm.

20 Claims, 2 Drawing Sheets

MAGNETIC TAPE AND MAGNETIC TAPE DEVICE

CROSS-REFERENCE TO RELATED APPLICATIONS

This application claims priority under 35 U.S.C 119 to Japanese Patent Application No. 2016-057866 filed on Mar. 23, 2016. The above application is hereby expressly incorporated by reference, in its entirety.

BACKGROUND OF THE INVENTION

Field of the Invention

The present invention relates to a magnetic tape and a magnetic tape device.

Discussion of the Background

Magnetic recording media include tape-shaped media and disk-shaped media. Magnetic recording media in the form of tapes—that is, magnetic tapes—are primarily employed in data storage applications, such as data backup and archives. Information is normally recorded on and reproduced from magnetic tapes by running a magnetic tape in a magnetic tape device (generally called a "drive") and causing the surface of the magnetic layer of the magnetic tape to come in contact with (slide against) a magnetic head.

Controlling the state in which lubricant is present on the surface of the magnetic layer (see Japanese Unexamined Patent Publication (KOKAI) No. 2012-43495 or English language family members US2012/045664A1, U.S. Pat. No. 9,311,946 and US2016/180875A1., which are expressly incorporated herein by reference in their entirety), controlling the shape of the surface of the magnetic layer (see Japanese Unexamined Patent Publication (KOKAI) No. 2011-48878 or English language family members US20111052908A1 and U.S. Pat. No. 8,535,817, which are expressly incorporated herein by reference in their entirety), and the like, have been investigated with regard to such contact between the magnetic head and the surface of the magnetic layer. Such investigation has been carried out, for example, to achieve both improved smoothness of the surface of the magnetic layer and various properties demanded of magnetic recording media such as magnetic tapes (for example, see Japanese Unexamined Patent Publication (KOKAI) No. 2012-43495, paragraphs 0003 to 0011).

SUMMARY OF THE INVENTION

Information is normally recorded on magnetic tapes by recording a magnetic signal on the data bands of magnetic tapes. Data tracks are thus formed in data bands. With huge increases in the quantity of information in recent years, increases in recording capacity (higher capacity) have been demanded of magnetic tapes. An example of one way of achieving higher capacity is to reduce the width of the data track so that more data tracks can be formed in the widthwise direction of the magnetic tape, increasing the recording density.

However, when the data track width is reduced, in the process of running a magnetic; tape within a magnetic tape device (drive) for recording and/or reproducing a magnetic signal, variation in the position of the magnetic tape in the widthwise direction makes it difficult for the magnetic head to accurately follow the data track. This tends to cause more errors to occur during recording and/or reproduction. Accordingly, one means of reducing the generation of such errors proposed in recent years is to employ head tracking servo that uses servo signals (hereinafter referred to as "servo systems"), and put to practical use.

Among servo systems, in a magnetic servo-type servo system, a servo signal (servo pattern) is formed on the magnetic layer of a magnetic tape, and the servo pattern is magnetically read to conduct head tracking. This will be described in greater detail below.

First, a servo head reads the servo signal that has formed on the magnetic layer. The position of the magnetic head in the widthwise direction of the magnetic tape is controlled based on the servo signal that has been read. Consequently, when running a magnetic tape within a magnetic tape device to record and/or reproduce a magnetic signal (information) it is possible to increase the precision with which the magnetic head follows the data tracks, even when the position of the magnetic tape fluctuates in the widthwise direction relative to the magnetic head. In this manner, it is possible to accurately record information on the magnetic tape, and/or accurately reproduce information that has been recorded on the magnetic tape.

The timing based servo system has been widely employed in recent years as the servo system of the magnetic servo system set forth above. In the servo system of a timing based servo system (hereinafter referred to as a "timing based servo system"), multiple servo patterns of two or more differing forms are formed on the magnetic layer and the position of the servo head is determined based on the time interval at which the servo head reproduces (reads) two servo patterns of different form, as well as the time interval at which two servo patterns of identical shape are reproduced. The position of the magnetic head in the widthwise direction of the magnetic tape is controlled based on the position of the servo head that is determined in this manner.

Increased surface smoothness of the magnetic layer has been demanded of magnetic tapes in recent years. That is because increasing the surface smoothness of the magnetic layer relates to enhancing electromagnetic characteristics. As stated above, investigation into achieving both enhanced surface smoothness of the magnetic layer and various properties demanded of magnetic recording media such as magnetic tapes has been conducted for some time. However, in repeated research conducted by the present inventors, it has become clear that a previously unknown phenomenon occurs whereby the precision with which the magnetic head follows a data track (referred to as "head positioning precision" hereinafter) ends up decreasing in timing based servo systems when the surface smoothness of the magnetic layer of a magnetic tape is increased.

An aspect of the present invention provides for achieving both increased surface smoothness of the magnetic layer in a magnetic tape and enhanced head positioning precision in a timing based servo system.

An aspect of the present invention relates to a magnetic tape having a magnetic layer containing ferromagnetic powder and binder on a nonmagnetic support, wherein:

a timing base servo pattern is present on the magnetic layer;

the centerline average surface roughness Ra that is measured on the surface of the magnetic layer is less than or equal to 1.8 nm;

the magnetic layer contains a fatty acid ester;

the full width at half maximum of the spacing distribution measured by optical interferometry on the surface of the magnetic layer before vacuum heating the magnetic tape (also referred to as the "$FWHM_{before}$" hereinafter) is greater than 0 am but less than or equal to 7.0 nm;

the full width at half maximum of the spacing distribution measured by optical interferometry on the surface of the magnetic layer after vacuum heating the magnetic tape (also referred to as the "FWHM$_{after}$" hereinafter) is greater than 0 nm but less than or equal to 7.0 nm; and the difference (S$_{after}$–S$_{before}$) of the spacing S$_{after}$ measured by optical interferometry on the surface of the magnetic layer after vacuum heating the magnetic tape and the spacing S$_{before}$ measured by optical interferometry on the surface of the magnetic layer before vacuum heating the magnetic tape is greater than 0 nm but less than or equal to 8.0 nm.

In the present invention and present specification, the "timing based servo pattern" refers to a servo pattern permitting head tracking in a timing based servo system. Timing based servo systems are as set forth above. A servo pattern permitting head tracking in a timing based servo system is formed as multiple servo patterns of two or more different shapes on the magnetic layer by a servo pattern recording head (called a "servo write head"). In one example, multiple servo patterns of two or more different shapes are continuously disposed at fixed intervals as multiple servo patterns of identical shape. In another example, different types of servo patterns are disposed in alternating fashion. Servo patterns being of identical shape do not mean that they are of completely identical shape; some error in shape produced by the device, such as a servo write head, is permissible. The shape of a servo pattern that permits head tracking in a timing based servo system and the disposition on the magnetic layer are known. Specific forms will be described further below. A timing based servo pattern will also be referred to simply as a "servo pattern" hereinafter. Heads in the form of "servo write heads," "servo heads," and "magnetic heads" will be referred to in the present specification. A servo write head refers to a head that records a servo signal (that is, forms a servo pattern) as set forth above. A servo head refers to a head that reproduces a servo signal (that is, reads a servo pattern). And a magnetic head, unless specifically stated otherwise, refers to a head that records and/or reproduces information.

In the present invention and present specification, the centerline average surface roughness Ra (hereinafter referred to as the "magnetic layer surface Ra") that is measured on the surface of the magnetic layer of a magnetic tape is a value that is measured for an area of 40 μm×40 μm by an atomic force microscope (AFM). The following measurement conditions are an example of measurement conditions. The centerline average surface roughness Ra indicated in Examples set forth further below are values obtained by measurement under the following conditions. In the present invention and present specification, the "surface of the magnetic layer" of a magnetic tape is synonymous with the surface of the magnetic tape on the magnetic layer side.

An area of 40 μm×40 μm on the surface of the magnetic layer of a magnetic tape is measured by AFM (Nanoscope 4 made by Veeco Corp.). The scan rate (probe displacement rate) is 40 μm/s and the resolution is 512 pixels×512 pixels.

In the present invention and present specification, the "vacuum heating" of a magnetic tape is conducted by maintaining the magnetic tape for 24 hours in an environment of an atmospheric temperature of 70° C. to 90° C. and a pressure of greater than or equal to 200 Pa but less than or equal to 0.01 MPa.

In the present invention and present specification, the spacing that is measured by optical interferometry on the surface of the magnetic layer of the magnetic tape is a value measured by the following method.

A magnetic tape and a transparent, sheet-shaped member (such as a sheet of glass) are superposed with the surface of the magnetic layer of the magnetic tape facing the transparent sheet-shaped member. In this state, a pressing member is caused to apply a pressure of 5.05×10$^4$ N/m (0.5 atm) to the sheet-shaped member from the side opposite to the side at which the sheet-shaped member faces with the surface of the magnetic layer of the magnetic tape. In this state, light is irradiated onto the surface of the magnetic layer of the magnetic tape through the transparent sheet-shaped member (scope of irradiation: 150,000 to 200,000 μm$^2$). The spacing (distance) between the surface of the magnetic layer of the magnetic tape and the surface of the transparent sheet-shaped member is obtained based on the strength of the interfering light (for example, the contrast in an interference fringe image) generated by the difference in the optical paths of the light reflecting off the surface of the magnetic layer of the magnetic tape and the light reflecting off the surface of the transparent sheet-shaped member on the magnetic tape side. The light that is irradiated is not specifically limited. When the light that is irradiated is light having emission wavelengths over a relatively broad range of wavelengths, such as white light containing multiple wavelengths, a member having the function of selectively cutting light of a specific wavelength or light outside a specific wavelength range, such as an interference filter, is disposed between the transparent sheet-shaped member and the light-receiving element receiving reflected light, and light of some portion of the wavelength or portion of the wavelength range of the reflected light is selectively caused to enter the light-receiving element. When the light that is irradiated is light having a single emission peak (so-called "monochromic light"), this member need not be employed. The wavelength of the light caused to enter the light-receiving element, for example, falls within a range of 500 nm to 700 nm, but is not specifically limited. It suffices for the transparent sheet-shaped member to be a member having a transparence such that it passes the light that is irradiated to a degree making it possible to irradiate the magnetic tape through the member and obtain interfering light.

The above measurement can be conducted with a commercial tape spacing analyzer (TSA) made by Micro Physics Corp., for example. The spacing measurement in Examples was conducted with a tape spacing analyzer made by Micro Physics Corp.

The "full width at half maximum" of the spacing distribution in the present invention and present specification refers to the full width at half maximum (FWHM) when the interference fringe image obtained by the above spacing measurement is separated into 300,000 points, the spacing of each point (the distance between the surface of the magnetic layer of the magnetic tape and the surface of the sheet-shaped member on the magnetic tape side) is determined, the values are used to plot a histogram, and the histogram is fit to a Gaussian distribution.

The difference S$_{after}$–S$_{before}$ refers to a value obtained by subtracting the most frequent value before vacuum heating from the most frequent value after vacuum heating at the above 300,000 points.

In one embodiment, the centerline average surface roughness Ra that is measured on the surface of the magnetic layer is greater than or equal to 1.2 nm but less than or equal to 1.8 nm.

In one embodiment, the centerline average surface roughness Ra that is measured on the surface of the magnetic layer is greater than or equal to 1.2 nm but less than or equal to 1.6 nm.

In one embodiment, the difference ($S_{after}-S_{before}$) is greater than 0 nm but less than or equal to 7.5 nm.

In one embodiment, the full width at half maximum of the spacing distribution that is measured by optical interferometry on the surface of the magnetic layer before vacuum heating the magnetic tape is greater than 0 nm but less than or equal to 5.0 nm.

In one embodiment, the full width at half maximum of the spacing distribution that is measured by optical interferometry on the surface of the magnetic layer after vacuum heating the magnetic tape is greater than 0 nm but less than or equal to 5.0 nm.

In one embodiment, the magnetic layer contains nonmagnetic filler. The term "nonmagnetic filler" is synonymous with nonmagnetic powder. In the present invention and present specification, the term "nonmagnetic powder" means a collection of multiple nonmagnetic particles. The term "collection" is not limited to forms in which the constituent particles are in direct contact, but also includes forms in which binder, additives, or the like are present between the particles. The term "particles" is also sometimes employed to denote powder. The above points are also applied to the various powders in the present invention and present specification, such as ferromagnetic powder.

In one embodiment, the nonmagnetic filler is colloidal particles. In the present invention and present specification, the term "colloidal particles" refers to particles that are capable of dispersing, without precipitating, to form a colloidal dispersion when added to organic solvent in the form of at least one selected from the group consisting of methyl ethyl ketone, cyclohexanone, toluene, ethyl acetate, and mixed solvents of two or more of the same in any mixing ratio, in a quantity of 1 g per 100 mL of organic solvent.

In one embodiment, the above colloidal particles are silica colloidal particles.

In one embodiment, a nonmagnetic layer containing nonmagnetic powder and binder is present between the nonmagnetic support and magnetic layer in the above magnetic tape.

A further aspect of the present invention relates to a magnetic tape device containing the above magnetic tape, a magnetic head, and a servo head.

An aspect of the present invention can provide a magnetic tape in which a timing based servo pattern is present on a magnetic layer with a highly smooth surface and in which the head positioning precision of the timing based servo system is enhanced, as well as a magnetic tape device that records and/or reproduces magnetic signals on this magnetic tape.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Magnetic Tape

An aspect of the present invention relates to a magnetic tape in which a timing base servo pattern is present on the magnetic layer; the centerline average surface roughness Ra that is measured on the surface of the magnetic layer is less than or equal to 1.8 nm; the magnetic layer contains a fatty acid ester; the full width at half maximum of the spacing distribution measured by optical interferometry on the surface of the magnetic layer before vacuum heating the magnetic tape ($FWHM_{before}$) is greater than 0 nm but less than or equal to 7.0 nm; the full width at half maximum of the spacing distribution measured by optical interferometry on the surface of the magnetic layer after vacuum heating the magnetic tape ($FWHM_{after}$) is greater than 0 nm but less than or equal to 7.0 nm; and the difference ($S_{after}-S_{before}$) of the spacing $S_{after}$ measured by optical interferometry on the surface of the magnetic layer after vacuum heating the magnetic tape and the spacing $S_{before}$ measured by optical interferometry on the surface of the magnetic layer before vacuum heating the magnetic tape is greater than 0 nm but less than or equal to 8.0 nm.

The above magnetic tape will be described in greater detail. The description set forth below contains presumptions by the present inventors. The present invention is not limited by such presumptions. Descriptions of examples based on the drawings are presented below. However, the present invention is not limited by such examples.

<Timing Based Servo Patterns>

A timing based servo pattern is present on the magnetic layer in the above magnetic tape. The term "timing based servo pattern" means the servo pattern described above. For example, in a magnetic tape in which a linear recording system is applied, which is a widely employed recording system in magnetic tape devices, multiple regions in which servo patterns are formed (referred to as "servo bands") are present in the longitudinal direction of the magnetic tape. A region that is sandwiched between two servo bands is called a data band. Information (a magnetic signal) is recorded on the data band. Multiple data tracks are formed in the longitudinal direction within each data band.

Figure 1:
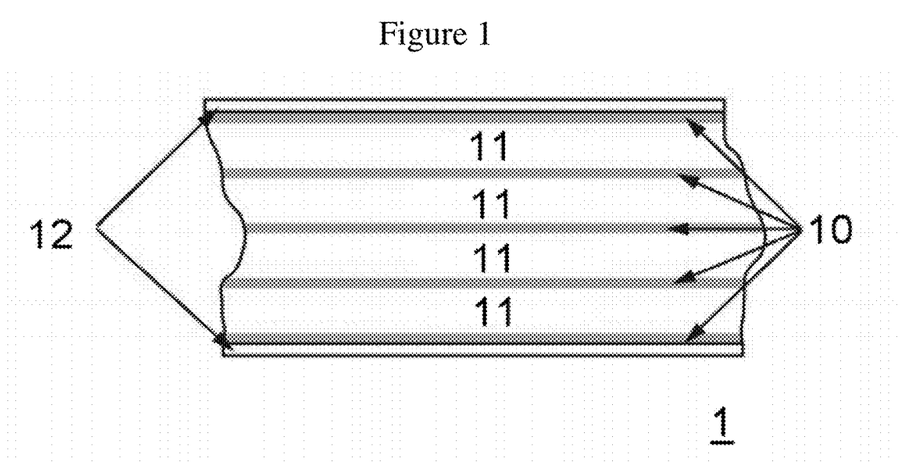
FIG. 1 shows an example of the configuration of the data band and servo band.
Figure 2:
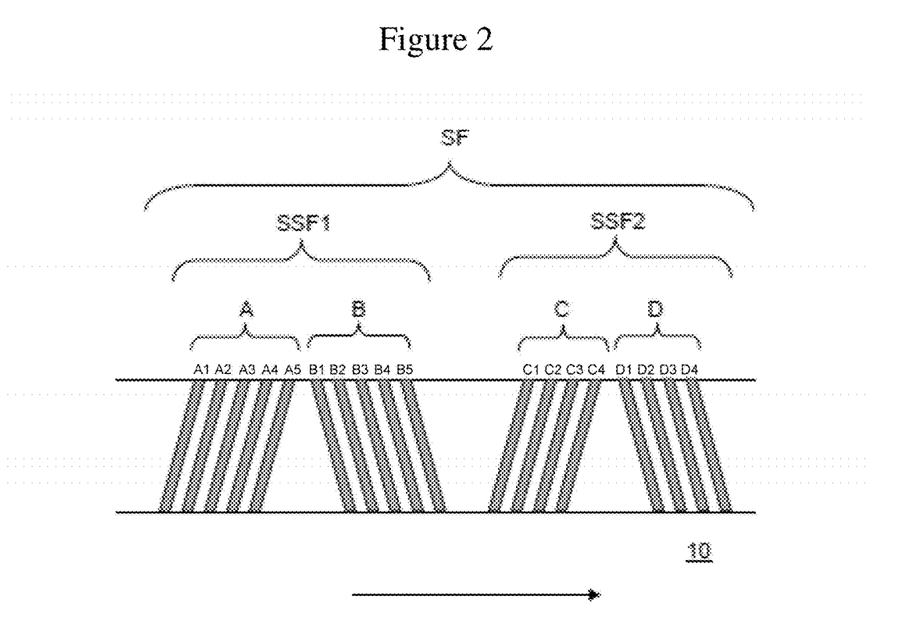
FIG. 2 shows an example of the servo pattern configuration of a tape of LTO (Linear-Tape-Open) Ultrium format.

FIG. 1 shows an example of the disposition of data bands and servo bands. In FIG. 1, multiple servo bands 10 are disposed sandwiched between guide bands 12 on the magnetic layer of a magnetic tape 1. The multiple regions 11 sandwiched between two servo bands are data bands. A servo pattern is a magnetized region, which is formed by a servo write head, which magnetizes the specific region of the magnetic layer. The regions that are magnetized by the servo write head (positions where the servo pattern is formed) are regularly established. For example, during manufacturing of the magnetic tape in an LTO Ultrium format tape, which is an industry standard, multiple servo patterns that are situated on an incline relative to the widthwise direction of the tape (as shown in FIG. 2) are formed on the servo band. Specifically, the servo frame SF on data band 10 in FIG. 2 is comprised of servo sub-frame 1 (SSF1) and servo sub-frame 2 (SSF2). Servo sub-frame 1 is comprised of burst A (symbol A in FIG. 2) and burst B (symbol B in FIG. 2). Burst A is comprised of servo patterns A1 to A5, and burst B is comprised of servo patterns B1 to B5. Additionally, servo sub-frame 2 is comprised of burst C (symbol C in FIG. 2) and burst D (symbol D in FIG. 2). Burst C is comprised of servo patterns C1 to C4 and burst D is comprised of servo patterns D1 to D4. Eighteen of such servo patterns are disposed in sets of 5 and 4 in a 5, 5, 4, 4 arrangement that is disposed in sub-frames, and used to identify the servo frame. One servo frame is shown in FIG. 2. However, multiple servo frames are disposed in the running direction in each data band. The arrow denotes the running direction in FIG. 2.

In a timing based servo system, the position of the servo head is identified by means of time intervals where two servo patterns of different shape are reproduced (read) by a servo head and time intervals where two servo patterns of identical shape are reproduced. The time intervals are normally calculated as time intervals between peaks in the reproduced waveforms of the servo signal. For example, in the embodiment shown in FIG. 2, the servo pattern of burst A and the servo pattern of burst C are servo patterns of identical shape. The servo pattern of burst B and the servo pattern of burst D are servo patterns of identical shape. The servo pattern of burst A and the servo pattern of burst C is a servo pattern with a different shape from the servo pattern of burst B and the servo pattern of burst D. The time interval at which servo patterns of different shape are reproduced by the servo head is, for example, the interval between the time when any servo pattern of burst A is reproduced and the time when any servo pattern of burst B is reproduced. The time interval between when two servo patterns of identical shape are reproduced by the servo head refers, for example, to the interval between the time when any servo pattern of burst A is reproduced and the time when any servo pattern of burst C is reproduced.

A timing based servo system is a system in which, when the time interval slips from the setting value, the slip in the time interval is assumed to be caused by a change in the position of the magnetic tape in the direction of width. The term "setting value" is the time interval when a magnetic tape runs without positional displacement in the direction of width. In a timing based servo system, the magnetic head is displaced in the direction of width based on the degree of the slip from the setting value of the time interval that is obtained. Specifically, the greater the slip from the setting value of the time interval, the greater the displacement of the magnetic head in the direction of width. This is not limited to the embodiments shown in FIGS. 1 and 2. It applies to timing based servo systems in general.

With respect to the above, the present inventors presume the following with regard to the above magnetic tape.

The reason a drop occurs in the head positioning precision in a timing based servo system in a magnetic tape in which the smoothness of the surface of the magnetic layer has been increased is thought to be that the factors behind the above slip from the setting value of the time interval include factors other than variation in the position of the magnetic head in the direction of width (referred to as "other factors" hereinafter). It is presumed that since a timing based servo system also identifies slips imparted by other factors as slips imparted by positional displacement in the direction of width of the magnetic tape, it ends up displacing the magnetic head by more than the distance required for it to track the positional displacement in the direction of width of the magnetic tape. This is presumed to be a reason of a drop in head positioning precision in a timing based servo system.

In conducting extensive research in the presumption that variation in the running speed of the servo head was one of these other factors (that is, a factor behind the slip from the setting value of the above time interval), the present inventors came to presume the following.

The present inventors presume that one cause for the variation in the speed of a servo head is sticking of the servo head and the surface of the magnetic layer. In this regard, they presume that a servo head is more prone to stick to the surface of the magnetic layer in a magnetic tape in which the magnetic layer surface Ra is less than or equal to 1.8 nm than in a magnetic tape with a rough surface of the magnetic layer in the course of a servo head running over the surface of the magnetic layer of a magnetic tape to read a servo signal.

Further, the present inventors presume that one cause for the variation in the speed of a servo head is shaving of the surface of the magnetic layer due to contact with the servo head, with these shavings adhering to the servo head.

The present inventors, presuming the above, conducted further extensive research resulting in the discovery that it was possible to improve the head positioning precision in a timing based servo system in a magnetic tape with a magnetic layer surface Ra of less than or equal to 1.8 nm by keeping the above $FWHM_{before}$, $FWHM_{after}$, and difference ($S_{after}-S_{before}$) within the respective ranges set forth above. The presumptions of the present inventors in this regard are as set forth in (1) and (2) below.

(1) Portions (protrusions) that primarily contact the servo head during running of the servo head (so-called "actual contact") and portions that are lower than these portions (referred to as the "base portion" hereinafter) are normally present on the surface of the magnetic layer. The present inventors presume that the above spacing is a value that indicates the distance between the servo head and the base portion during running of the servo head. However, when lubricant contained in the magnetic layer forms a liquid film on the surface of the magnetic layer, this liquid film is present between the base portion and the servo head. This is thought to reduce the spacing by the amount of the thickness of the liquid film.

Lubricants can generally be roughly divided into fluid lubricants and boundary lubricants. The fatty acid ester that is contained in the magnetic layer of the above magnetic tape is said to be a component that can function as a fluid lubricant. Fluid lubricants are thought to form a liquid film on the surface of the magnetic layer, effectively playing the role of protecting the surface of the magnetic layer. The present inventors presume that the presence of a liquid film of fatty acid ester on the surface of the magnetic layer can protect the surface of the magnetic layer and can inhibit shaving of the surface of the magnetic layer resulting from contact with the servo head. However, it is thought that when an excessive quantity of fatty acid ester is present on the surface of the magnetic layer, a meniscus (liquid bridge) is formed by the fatty acid ester between the surface of the magnetic layer and the head, causing sticking.

In this regard, the present inventors focused on the fact that fatty acid esters are components that have the property of being volatilized by vacuum heating. They adopted the difference in spacing ($S_{after} - S_{before}$) after vacuum heating (the state where the liquid film of fatty acid ester has volatilized away) and before vacuum heating (the state where the liquid film of fatty acid ester is present) as an indicator of the thickness of the liquid film of fatty acid ester that formed on the surface of the magnetic layer. The present inventors presume that causing a liquid film of fatty acid ester to be present on the surface of the magnetic layer so that this film is greater than 0 nm but is less than or equal to 8.0 nm, relates to inhibiting shaving of the surface of the magnetic layer resulting from contact with the servo head.

(2) The lower the value of the full width at half maximum of the spacing distribution, the less variation in the value of the spacing measured in various parts of the surface of the magnetic layer that is indicated. The present inventors conducted extensive research. As a result, they came to presume that increasing the uniformity in the height of the protrusions present on the surface of the magnetic layer, increasing the uniformity in the thickness of the liquid film of fatty acid ester, and increasing the uniformity in the state of contact between the surface of the magnetic layer and the servo head were effective ways to inhibit sticking of the servo head and the surface of the magnetic layer during running of the servo head and shaving of the surface of the magnetic layer.

In this regard, they presume that the main reasons for variation in the spacing value are variation in the height of protrusions on the surface of the magnetic layer and variation in the thickness of the liquid film of fatty acid ester. The spacing distribution $FWHM_{before}$ that is measured before vacuum heating, that is, in the state where the liquid film of fatty acid ester is present on the surface of the magnetic layer, is presumed to increase with variation in the height of the protrusions and with variation in the thickness of the liquid film of fatty acid ester. Of these, the present inventors presume that variation in the thickness of the liquid film of fatty acid ester has a major effect. By contrast, the spacing distribution $FWHM_{after}$ that is measured after vacuum heating, that is, in a state where the liquid film of fatty acid ester has been removed from the surface of the magnetic layer, is presumed by the present inventors to increase with variation in the height of the protrusions. That is, the present inventors presume that the smaller both the spacing distribution $FWHM_{before}$ and $FWHM_{after}$ become, the less variation in the thickness of the liquid film of the fatty acid ester on the surface of the magnetic layer and the less variation in the height of the protrusions are indicated. Controlling both variation in the thickness of the liquid film of fatty acid ester on the surface of the magnetic layer and variation in the height of the protrusions clearly differs from the conventional controlling of the shape of the surface of the magnetic layer in the manner described in the above Japanese Unexamined Patent Publication (KOKAI) No. 2011-48878. It has become clear that it is possible to improve the head positioning precision in a timing based servo system by increasing the uniformity of the thickness of the liquid film of fatty acid ester and of the height of the protrusions so that both the spacing distribution $FWHM_{before}$ and $FWHM_{after}$ are greater than 0 nm but less than or equal to 7.0 nm. A description relating to spacing is also found in the above Japanese Unexamined Patent Publication (KOKAI) No. 2012-43495. However, no description relating to spacing before and after vacuum heating or spacing distribution, nor description suggesting controlling the spacing distribution, is to be found in Japanese Unexamined Patent Publication (KOKAI) No. 2012-43495.

However, the above is merely presumed by the present inventors, and does not limit the present invention in any way.

The above magnetic tape will be described in greater detail below.

<Magnetic Layer Surface Ra>

The centerline average surface roughness Ra (magnetic layer surface Ra) that is measured on the surface of the magnetic layer of the above magnetic tape is less than or equal to 1.8 nm. In a magnetic tape in which the magnetic layer surface Ra is less than or equal to 1.8 nm, if no countermeasures are adopted, a phenomenon whereby the head positioning precision decreases in a timing based servo system will end up occurring. By contrast, in the above magnetic tape having the $FWHM_{before}$, $FWHM_{after}$, and difference ($S_{after} - S_{before}$) within the respective ranges set forth above, despite a magnetic layer surface Ra of less than or equal to 1.8 nm, it is possible to inhibit the drop in head positioning precision in a timing based servo system. Presumptions by the present inventors in this regard are as set forth above. The above magnetic tape with a magnetic layer surface Ra of less than or equal to 1.8 nm can exhibit good electromagnetic characteristics. From the perspective of further enhancing electromagnetic characteristics, the magnetic layer surface Ra is desirably less than or equal to 1.7 nm, preferably less than or equal to 1.6 nm, and more preferably, less than or equal to 1.5 nm. The magnetic layer surface Ra can be greater than or equal to 1.2 nm, for example. However, from the perspective of enhancing the electromagnetic characteristics, the lower the magnetic layer surface Ra is, the better. Thus, values falling below this value, given by way of example, are possible.

The magnetic layer surface Ra can be controlled by known methods. For example, since the magnetic layer surface Ra can be changed based on the size of the various powders contained in the magnetic layer (for example, ferromagnetic powder and optionally incorporated nonmagnetic powder), the manufacturing conditions of the magnetic tape, and the like, these can be adjusted to obtain a magnetic tape with a magnetic layer surface Ra of less than or equal to 1.8 nm.

<$FWHM_{before}$, $FWHM_{after}$>

Both the $FWHM_{before}$ before vacuum heating and the $FWHM_{after}$ after vacuum heating that are measured on the magnetic tape are greater than 0 nm but less than or equal to 7.0 nm. As set forth above, the present inventors presume that this can contribute to improving the head positioning precision in a timing based servo system. From the perspective of further improving the head positioning precision in a timing based servo system, the $FWHM_{before}$ and $FWHM_{after}$ are desirably less than or equal to 6.5 nm, preferably less than or equal to 6.0 nm, more preferably less than or equal to 5.0 nm, and still more preferably, less than or equal to 4.5 nm. The $FWHM_{before}$ and $FWHM_{after}$ can be, for example, greater than or equal to 0.5 nm, greater than or equal to 1.0 nm, greater than or equal to 2.0 nm, or greater than or equal to 3.0 nm. From the perspective of the lower the value, the better the head positioning precision in a timing based servo system, values below those values given above by way of example are possible.

The $FWHM_{before}$ before vacuum heating can be lowered primarily by reducing variation in the thickness of the liquid film of fatty acid ester. Examples of specific means will be given further below. The $FWHM_{after}$ after vacuum heating can be lowered by reducing variation in the height of the protrusions on the surface of the magnetic layer. To that end, it is desirable to control the state in which powder components contained in the magnetic layer, such as the nonmagnetic filler that is described in detail farther below, are present. Examples of specific means will be given further below.

<Difference $S_{after} - S_{before}$>

The difference $S_{after} - S_{before}$ in the spacing before and after vacuum heating as measured on the above magnetic tape is greater than 0 nm but less than or equal to 8.0 nm. From the perspective of further improving the head positioning precision in a timing based servo system by inhibiting shaving of the surface of the magnetic layer coming into contact with the servo head, the difference $S_{after} - S_{before}$ is desirably greater than or equal to 0.1 nm, preferably greater than or equal to 1.0 nm. From the perspective of further improving the head positioning precision in a timing based servo system by inhibiting sticking of the servo head and the surface of the magnetic layer, the difference $S_{after} - S_{before}$ is desirably less than or equal to 7.5 nm, preferably less than or equal to 7.0 nm, more preferably less than or equal to 6.0 nm, still more preferably less than or equal to 5.0 nm, yet more preferably less than or equal to 4.0 nm, yet still more preferably less than or equal to 3.5 nm, and even more preferably, less than or equal to 3.0 nm. The difference $S_{after} - S_{before}$ can be controlled by means of the quantity of fatty acid ester added to the magnetic layer-forming composition. Further, in a magnetic tape in which a nonmagnetic layer is present between the nonmagnetic support and the magnetic layer, control can be achieved by means of the quantity of fatty acid ester that is added to the nonmagnetic layer-forming composition. The nonmagnetic layer can play the role of holding lubricant and supplying it to the magnetic layer. The fatty acid ester that is contained in the nonmagnetic layer can migrate to the magnetic layer and be present on the surface of the magnetic layer.

<Magnetic Layer>
(Fatty Acid Ester)

The above magnetic tape contains a fatty acid ester in the magnetic layer. One or more types of fatty acid esters can be contained. Examples of fatty acid esters are esters of lauric acid, myristic acid, palmitic acid, stearic acid, oleic acid, linoleic acid, linolenic acid, behenic acid, erucic acid, and eraidic acid. Specific examples are butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester in the magnetic layer is, for example, 0.1 to 10.0 weight parts, desirably 1.0 to 7.0 weight parts, per 100.0 weight parts of ferromagnetic powder. When employing two or more types of fatty acid ester as the fatty acid ester, the content refers to the combined content thereof. Unless specifically stated otherwise, the same is applied to the contents of other components in the present invention and present specification.

When a nonmagnetic layer is present between the nonmagnetic support and the magnetic layer in the above magnetic tape, the content of fatty acid ester in the nonmagnetic layer is, for example, 0 to 10.0 weight parts, desirably 0.1 to 8.0 weight parts, per 100.0 weight parts of nonmagnetic powder.

(Other Lubricants)

The above magnetic tape contains, at least in the magnetic layer, one type of lubricant in the form of a fatty acid ester. Lubricants other than fatty acid esters can be optionally contained in the magnetic layer and/or nonmagnetic layer. As stated above, lubricants contained in the nonmagnetic layer are capable of migrating to the magnetic layer side and being present on the surface of the magnetic tape. Fatty acids are an example of lubricants that are optionally contained. Fatty acid amides are further examples. While fatty acid esters are components that can function as fluid lubricants, fatty acids and fatty acid amides are components that can function as boundary lubricants. Boundary lubricants are thought to adsorb to the surface of powder (such as ferromagnetic powder) and form a strong lubricating film, thereby lowering contact friction.

Examples of fatty acids are lauric acid, myristic acid, palmitic acid, stearic acid, oleic acid, linoleic acid, linolenic acid, behenic acid, erucic acid, and eraidic acid. Stearic acid, myristic acid, and palmitic acid are desirable. Stearic acid is preferred. The fatty acid can be contained in the form of a salt such as a metal salt in the magnetic layer.

Examples of fatty acid amides are the amides of the various fatty acids set forth above. Examples are amide laurate, amide myristate, amide palmitate, and amide stearate.

With regard to fatty acids and fatty acid derivatives (such as amides and esters), the fatty acid-derived portion of the fatty acid derivative desirably has a structure that is identical or similar to any fatty acid with which it is employed in combination. For example, when employing a fatty acid in the form of stearic acid, it is desirable to employ a stearic acid ester or amide stearate.

The content of the fatty acid in the magnetic layer is, for example, 0 to 10.0 weight parts, desirably 0.1 to 10.0 weight parts, and preferably, 1.0 to 7.0 weight parts, per 100.0 weight parts of ferromagnetic powder. The content of fatty acid amide in the magnetic layer is, for example, 0 to 3.0 weight parts, desirably 0 to 2.0 weight parts, and preferably, 0 to 1.0 weight parts, per 100 weight parts of ferromagnetic powder.

When a nonmagnetic layer is present between the nonmagnetic support and magnetic layer in the above magnetic tape, the content of fatty acid in the nonmagnetic layer is, for example, 0 to 10.0 weight parts, desirably 1.0 to 10.0 weight parts, preferably 1.0 to 7.0 weight parts, per 100.0 weight parts of nonmagnetic powder. The content of fatty acid amide in the nonmagnetic layer is, for example, 0 to 3.0 weight parts, desirably 0 to 1.0 weight parts, per 100.0 weight parts of nonmagnetic powder.

(Ferromagnetic Powder)

The various powders that are commonly employed as ferromagnetic powders in the magnetic layer of various magnetic recording media can be employed as the ferromagnetic powder. The use of a ferromagnetic powder of small average particle size is desirable from the perspective of increasing the recording density of the magnetic tape. For this reason, it is desirable to employ ferromagnetic powder with an average particle size of less than or equal to 50 nm as the ferromagnetic powder. From the perspective of stability of magnetization, the average particle size of the ferromagnetic powder is desirably greater than or equal to 10 nm.

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The average particle size of various powders such as ferromagnetic powder is a value measured with a transmission electron microscope by the following method.

Powder is photographed at a magnification of 100,000-fold with a transmission electron microscope, and the photograph is printed on print paper at a total magnification of 500,000-fold to obtain a photograph of the particles constituting the powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and present specification, the average particle size of the powder, such as ferromagnetic powder and various kinds of powder is the average particle size as obtained by the above method unless specifically stated otherwise. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-48878, which is expressly incorporated herein by reference in its entirety, for example, can be employed as the method of collecting sample powder such as ferromagnetic powder from a magnetic layer for particle size measurement.

In the present invention and present specification, the size of the particles constituting powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

Unless specifically stated otherwise, when the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

The content (fill rate) of ferromagnetic powder in the magnetic layer desirably falls within a range of 50 to 90 weight %, and preferably falls within a range of 60 to 90 weight %. Components of the magnetic layer other than the ferromagnetic powder include binder and a fatty acid ester, and can include one or more additives. A high fill rate of the ferromagnetic powder in the magnetic layer is desirable from the perspective of increasing the recording density.

(Binder)

The magnetic layer of the above magnetic tape contains binder in addition to ferromagnetic powder and fatty acid ester. Binder is one or more resins. The binder employed can be in the form of polyurethane resin, polyester resin, polyamide resin, vinyl chloride resin, acrylic resin obtained by copolymerizing styrene, acrylonitrile, methyl methacrylate and the like, nitrocellulose and other cellulose resins, epoxy resin, phenoxy resin, polyvinyl acetal, polyvinyl butyral, and other polyvinyl alkyrals. These resins can be employed singly or two or more resins can be mixed for use. Of these, polyurethane resin, acrylic resin, cellulose resin anti vinyl chloride resin are desirable. These resins can be homopolymer or copolymer. They can also be employed as binder in the nonmagnetic layer and/or backcoat layer described further below. Reference can be made to Japanese Unexamined Patent Publication (KOKAI) No. 2010-24113, paragraphs 0028 to 0031, with regard to the binder. The content of the above publication is expressly incorporated herein by reference in its entirety. The binder can also be radiation-curable resin such as electron beam-curable resin. Reference can be made to Japanese Unexamined Patent Publication (KOKAI) No. 2011-48878, paragraph 0044 and 0045, with regard to radiation-curable resin.

Curing agents can be employed along with the above resin that can be employed as the binder. Curing agents are compounds containing one or more crosslinkable functional groups per molecule. Polyisocyanates are suitable as curing agents. Reference can be made to Japanese Unexamined Patent Publication (KOKAI) No. 2011-216149, paragraphs 0124 and 0125, for details regarding polyisocyanates. The curing agent can be employed, for example, in a quantity of 0 to 80.0 weight parts, and desirably 50.0 to 80.0 weight parts from the perspective of enhancing the strength of the various layers such as the magnetic layer, per 100.0 weight parts of binder.

(Other Components)

Additives can be added as needed to the magnetic layer. The magnetic layer desirably contains one or more nonmagnetic fillers. Examples of nonmagnetic fillers are nonmagnetic, fillers that are primarily added to control protrusions on the surface of the magnetic layer (also referred to as "protrusion-forming agents" hereinafter) and nonmagnetic fillers that are added as abrasives to impart abrasiveness to the surface of the magnetic layer. The magnetic layer desirably contains at least a protrusion-forming agent, and preferably contains a protrusion-forming agent and an abrasive.

Nonmagnetic fillers that are capable of functioning as protrusion-forming agents can be either organic or inorganic powder. Inorganic powder is desirable. Carbon black is also desirable. Carbon black with an average particle size (average primary particle size) of greater than or equal to 20 nm is desirable, and one with greater than or equal to 30 nm is preferred. The average particle size of carbon black is desirably less than or equal to 150 nm, preferably less than or equal to 100 nm.

Examples of inorganic powder are particles of metal oxides, metal carbonates, metal sulfates, metal nitrides, metal carbides, and metal sulfides. Specific examples are powder of α-alumina, β-alumina, γ-alumina, θ-alumina, silicon oxides such as silicon dioxide, silicon carbide, chromium oxide, cerium oxide, α-iron oxide, goethite, corundum, silicon nitride, titanium carbide, titanium dioxide, tin oxide, magnesium carbonate, tungsten oxide, zirconium oxide, boron nitride, zinc oxide, calcium carbonate, calcium sulfate, barium sulfate, and molybdenum disulfide, as well as composite inorganic powder of two or more of the above. Inorganic oxide powder is preferred and silicon oxide powder is of greater preference.

From the perspective of further enhancing the electromagnetic characteristics, the nonmagnetic filler that is capable of functioning as protrusion-forming agents is desirably of highly uniform particle size. From the perspective of the availability of particles of highly uniform particle size, the nonmagnetic filler is desirably colloidal particles. When the nonmagnetic filler that is contained in the magnetic layer is colloidal particles, it suffices to evaluate whether the nonmagnetic filler has properties that meet the definition of colloidal particles that is set forth above if the nonmagnetic filler employed to form the magnetic layer is available. Alternatively, nonmagnetic filler removed from the magnetic layer can be evaluated to determine whether it has properties that satisfy the definition of colloidal particles set forth above. For example, the nonmagnetic filter can be removed from the magnetic layer by the following method.

1. Scraping off about 1 g of magnetic layer. The scraping can be done with a razor blade, for example.
2. Placing the magnetic layer sample that has been obtained by scraping in a container such as an eggplant-shaped flask and adding 100 mL of tetrahydrofuran to the container. Tetrahydrofuran comes in the form of commercial products to which a stabilizer has been added, and in the form of commercial products without stabilizer. A tetrahydrofuran to which no stabilizer has been added is used. The same is applied to the tetrahydrofuran that is employed for washing further below.
3. Mounting a reflux condenser on the container and heating the contents for 90 minutes in a bath at a water temperature of 60° C. Filtering with filter paper the contents of the container after heating, washing several times with tetrahydrofuran the solid component that has remained on the filter paper, and transferring the solid component to a container such as a beaker following washing. 4N (4 mol/L) hydrochloric acid aqueous solution is added to the container and non-dissolved residue is collected by filtration with a filter. A filter with a pore diameter smaller than 0.05 μm is employed. For example, a membrane filter (such as an MF Millipore made by Merck Corp.) that is employed in chromatographic analysis can be employed. Washing the residue that has been removed by filtration with a filter several times with pure water and then drying it.

Dissolving the ferromagnetic powder and organic material (binder and the like) obtained by the above operation and recovering the nonmagnetic filler as a residue.

Nonmagnetic filler can be extracted from the magnetic layer by the above process. When multiple types of nonmagnetic fillers are contained in the nonmagnetic fillers that are thus extracted, the multiple types of nonmagnetic fillers are separated by differences in density.

Examples of desirable colloidal particles are inorganic oxide colloidal particles. The colloidal particles of the inorganic oxides set forth above are examples of inorganic oxide colloidal particles. Examples of composite inorganic oxide colloidal particles are $SiO_2.Al_2O_3$, $SiO_2.B_2O_3$, $TiO_2.CeO_2$, $SnO_2.Sb_2O_3$, $SiO_2.Al_2O_3.TiO_2$, and $TiO_2.CeO_2.SiO_2$. Desirable examples are inorganic oxide colloidal particles such as $SiO_2$, $Al_2O_3$, $ZrO_2$, and $Fe_2O_3$. Silica colloidal particles (colloidal silica) are preferred. Since the surface of common colloidal particles is hydrophilic, water is a suitable dispersion medium for fabricating a colloidal solution. For example, colloidal silica that has been obtained by a common synthesis method will have surfaces that are covered with polarized oxygen atoms ($O^{2-}$), and stabilization is achieved by forming hydroxyl groups by the adsorption of water in water. However, these particles tend not to be present in the form of a colloid in the organic solvents that are usually employed for the magnetic layer-forming composition. By contrast, the colloidal particles in the present invention and present specification refer to particles that are capable of dispersing without precipitating to yield a colloidal dispersion when 1 g is added to 100 mL of the organic solvent set forth above. These colloidal particles can be manufactured by known methods such as a surface treatment that renders the surface hydrophobic. The details of such a hydrophobic rendering treatment are given in Japanese Unexamined Patent Publication (KOKAI) Heisei Nos. 5-269365 and 5-287213, and Japanese Unexamined Patent Publication (KOKAI) No. 2007-63117. The contents of the above publications are expressly incorporated herein by reference in their entirety.

Two types of manufacturing method are generally known for manufacturing desirable colloidal particles in the form of silica colloidal particles (colloidal silica): the water glass method and the sol-gel method. The water glass method refers to a method of subjecting a starting material in the form of sodium silicate (so-called water glass) to an ion exchange to generate active silicic acid, and then growing particles. The sol-gel method is a method of employing tetraalkoxysilane as a starting material and growing particles simultaneously with hydrolysis in the presence of a basic catalyst. When employ silica colloidal particles as the nonmagnetic filler, the silica colloidal particles can be manufactured by either of these manufacturing methods.

As measured by the method set forth above, the average particle size of the nonmagnetic filler capable of functioning as a protrusion-forming agent desirably falls within a range of 50 nm to 200 nm, preferably within a range of 50 nm to 150 nm.

The content of the nonmagnetic filler capable of functioning as a protrusion-forming agent in the magnetic layer is desirably 1.0 to 4.0 weight parts, preferably 1.5 to 3.5 weight parts, per 100 weight parts of ferromagnetic powder.

Additionally, the nonmagnetic filler capable of functioning as an abrasive can be in the form of organic powder or inorganic powder. Inorganic powder is desirable. Examples of nonmagnetic powder capable of functioning as an abrasive are substances commonly employed as abrasives in the magnetic layer, such as powder of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, and diamond. Of these, powders of alumina such as α-alumina and silicon carbide are desirable. The content of the nonmagnetic filler capable of functioning as an abrasive in the magnetic layer desirably falls within a range of 1.0 to 20.0 weight pans, preferably within a range of 3.0 to 15.0 weight parts, and more preferably, within a range 4.0 to 10.0 weight parts, per 100.0 weight parts of ferromagnetic powder. The average particle size of the nonmagnetic filler capable of functioning as an abrasive falls, for example, within a range of 30 nm to 300 nm, desirably within a range of 50 nm to 200 nm.

One or more additives from the group consisting, of dispersing agents, dispersion adjuvants, fungicidal agents, antistatic agents, and oxidation-inhibiting agents can be further incorporated in any quantity into the magnetic layer. The additives can be suitably selected for use from among commercial products based on the properties desired.

The magnetic layer set forth above is positioned either directly on the nonmagnetic support or on a nonmagnetic layer formed on the nonmagnetic support. Details of the nonmagnetic layer and the nonmagnetic support will be described further below.

<Nonmagnetic Layer>

The above magnetic tape can have a magnetic layer directly on the surface of the nonmagnetic support. The above magnetic tape can have a nonmagnetic layer containing nonmagnetic powder and binder between the nonmagnetic support and the magnetic layer. The nonmagnetic powder that is employed in the nonmagnetic layer can be an organic or an inorganic material. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 to 90 weight %, preferably within a range of 60 to 90 weight %.

For other details regarding binder, additives, and the like in the nonmagnetic layer, known techniques relating to nonmagnetic layers can be applied. As a further example, known techniques relating to magnetic layers can be applied with regard to the quantity and type of binders and the quantity and type of additives.

The nonmagnetic layer in the present invention may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT or a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

<Backcoat Layer>

In the above magnetic tape, a backcoat layer containing nonmagnetic powder and binder can be present on the opposite side of the nonmagnetic support from the side on which the magnetic layer is present. Carbon black and/or inorganic powder are desirably incorporated into the backcoat layer. Known techniques relating to the formulas of the magnetic layer and/or the nonmagnetic layer can be applied to the binder that is contained, and the various additives that can be optionally contained, in the backcoat layer.

<Nonmagnetic Support>

The nonmagnetic support will be described next. Known nonmagnetic supports in the form of biaxially stretched polyethylene terephthalate, polyethylene naphthalate, polyamide, polyimide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Thickness of the Nonmagnetic Support, Thickness of Various Layers>

The thickness of the nonmagnetic support is desirably 3.00 μm to 20.00 μm, preferably 3.00 μm to 10.00 μm, and more preferably, 3.00 μm to 6.00 μm.

The thickness of the magnetic layer is desirably less than or equal to 100 nm, from the perspective of high-density recording that has been demanded in recent years. The thickness of the magnetic layer is preferably 10 nm to 100 nm, and more preferably 20 nm to 90 nm. A single magnetic layer will suffice. The magnetic layer can be divided into two or more layers having different magnetic characteristics, and known configurations of multilayer magnetic layers can be applied. The thickness of the magnetic layer when divided into two or more layers is the combined thickness of these layers.

The thickness of the nonmagnetic layer is, for example, 0.10 µm to 1.50 µm, and desirably 0.10 µm to 1.00 µm.

The thickness of the backcoat layer is desirably less than or equal to 0.90 µm, and preferably 0.10 µm to 0.70 µm.

The thickness of the various layers in the magnetic tape and the nonmagnetic support can be determined by known film thickness measuring methods. For example, a cross-section in the direction of thickness of the magnetic tape is exposed by a known technique such as with an ion beam or microtome, and the exposed cross-section is observed with a scanning electron microscope. The thickness determined at one spot in the direction of thickness by observing the cross-section can be adopted, or the thickness at two or more spots that have been randomly exposed—for example, two spots—can be determined and the arithmetic average thereof adopted. The thickness of each of the various layers can also be determined as a design thickness calculated from manufacturing conditions.

<Manufacturing Method>
<<Manufacturing a Magnetic Tape on which a Servo Pattern is Formed>>
(Preparation of Various Layer-Forming Compositions)

The composition for forming the magnetic layer, or an optionally provided nonmagnetic layer or backcoat layer, will normally contain solvent in addition to the various components set forth above. Examples of solvent are the organic solvents that are commonly employed to manufacture particulate magnetic recording media. The process of preparing the various layer-forming compositions normally includes at least a kneading step, dispersing step, and mixing steps provided as needed before and after these steps. Each of these steps can be divided into two or more stages. All of the starting materials, such as ferromagnetic powder, nonmagnetic powder, binder, fatty acid ester, various additives, and solvent, that are employed in the present invention can be added at the beginning or part way through any of the steps. The individual starting materials can also be divided up and added in two or more steps. For example, binder can be divided up and added in the kneading step, dispersing step, and in a kneading step after the dispersing step for viscosity adjustment. To manufacture the magnetic tape, conventionally known manufacturing techniques can be employed. An kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads and/or some other form of bead can be employed to disperse the compositions for forming the various layers. Dispersion beads with high specific gravity in the form of zirconia beads, titania beads, and steel heads are suitable as such dispersion beads. The particle diameter and fill rate of these dispersion beads can be optimized for use. A known disperser can be employed.

(Coating Step)

The magnetic layer can be formed by sequentially or simultaneously multilayer coating the magnetic layer-forming composition and nonmagnetic layer-forming composition. The backcoat layer can be formed by coating the backcoat layer-forming composition on the opposite side of the nonmagnetic support from the side on which the magnetic layer is present (or will be subsequently applied). Reference can be made to Japanese Unexamined Patent Publication (KOKAI) No. 2010-231843, paragraph 0066, for details regarding coatings for forming the various layers. The content of the above publication is expressly incorporated herein by reference in its entirety.

(Other Steps)

Reference can be made to Japanese Unexamined. Patent Publication (KOKAI) No. 2010-231843, paragraphs 0067 to 0070, with regard to various other steps for manufacturing magnetic tapes.

(Desirable Embodiment of the Manufacturing Method)

An example of a desirable manufacturing method is the manufacturing method of applying vibration to the magnetic layer to enhance uniformity of the thickness of the liquid film of fatty acid ester on the surface of the magnetic layer. The present inventors presume that applying vibration can cause the liquid film of fatty acid ester on the surface of the magnetic layer to flow, enhancing the uniformity of thickness of the liquid film.

That is, the above magnetic tape can be manufactured by a manufacturing method including:

coating and drying a magnetic layer-forming composition containing ferromagnetic powder, binder, and fatty acid ester on a nonmagnetic support to form a magnetic layer, and applying vibration to the magnetic layer that has been formed.

This manufacturing method can be identical to the usual method of manufacturing magnetic tape with the exception of applying vibration to the magnetic layer. The details are as set forth above.

The means of applying vibration is not specifically limited. For example, vibration can be applied to the magnetic layer by bringing the surface on the opposite side of the nonmagnetic support from the side on which the magnetic layer has been formed into contact with a vibration-imparting unit. Running can be conducted while bringing the nonmagnetic support on which the magnetic layer has been formed into contact with the vibration-imparting unit. The vibration-imparting unit can apply vibration to an object brought into contact with the unit, for example, by being equipped with internal ultrasonic vibrators. The vibration that is applied to the magnetic layer can be adjusted by means of the vibration frequency and intensity of the ultrasonic vibrators, and the contact period with the vibration-imparting unit. For example, the contact period can be adjusted based on the running speed during contact of the nonmagnetic support on which the magnetic layer has been formed with the vibration-imparting unit. These vibration-imparting conditions are not specifically limited. It suffices to set them in a manner permitting control of the full width at half maximum of the spacing distribution, in particular, the $FWHM_{before}$. It is also possible to optimize the conditions by conducting preliminary tests prior to actual manufacturing in order to set the vibration-imparting conditions.

The spacing distribution after vacuum heating, $FWHM_{after}$, tends to be decreased by intensifying the dispersion conditions of the magnetic layer-forming composition (for example, by increasing the number of times dispersion is conducted or by extending the dispersion period) or by intensifying the filtration conditions (for example, by employing a filter with a small pore diameter as the filter used in filtration or by increasing the number of times filtration is conducted with a filter). The present inventors presume this to be because the uniformity of the protrusions that are present on the surface of the magnetic tape can be enhanced by enhancing dispersion of the particulate material contained in the magnetic layer-forming composition, particularly of the nonmagnetic filler that are capable of functioning as a protrusion-forming agent set forth above, and by enhancing the uniformity of the particle size. The dispersion conditions and the filtration conditions can also be optimized by conducting preliminary testing prior to actual manufacturing.

In a magnetic tape having a magnetic layer containing nonmagnetic filler in the form of carbon black, the use of a dispersing agent as a magnetic layer component to enhance dispersion of the carbon black can be an effective way to reduce the full width at half maximum of the spacing distribution after vacuum heating $FWHM_{after}$. Examples of dispersing agents for carbon black are organic tertiary amines. Reference can be made to Japanese Unexamined Patent Publication (KOKAI) No. 2013-049832, paragraphs 0011 to 0018 and 0021 with regard to organic tertiary amines. The content of the above publication is expressly incorporated herein by reference in its entirety. The organic tertiary amine is preferably trialkylamine. The alkyl groups that are present in the trialkylamine desirably have 1 to 18 carbon atoms. The three alkyl groups that are present in the trialkylamine can be identical or different. Reference can be made to Japanese Unexamined Patent Publication (KOKAI) No. 2013-049832, paragraphs 0015 and 0016, for details about the alkyl groups. Trialkylamine in the form of trioctylamine is particularly desirable.

A desirable embodiment of the manufacturing method has been set forth above. However, the magnetic tape according to an aspect of the present invention is not limited to being manufactured by the above manufacturing method.

<<Forming a Servo Pattern>>

A timing based servo pattern is present on the magnetic layer of the above magnetic tape. FIG. 1 shows an example of the layout of regions (servo bands) which timing based servo patterns are formed and the regions (data bands) that are sandwiched between two servo bands. FIG. 2 shows an example of the layout of a timing based servo pattern. However, the layout examples shown in the various drawings are examples. It suffices to lay out the servo pattern, servo bands, and data bands in a layout based on the type of magnetic tape device (drive). By way of example, known technique such as the layout examples given in U.S. Pat. No. 5,689,384, FIGS. 4, 5, 6, 9, 17, 20, and the like, can be applied without limitation.

The servo pattern can be formed by magnetizing specific regions of the magnetic layer with a servo write head mounted on a servo writer. The regions that are magnetized by a servo write head (positions on which the servo pattern is formed) have been established in standards. A commercial servo writer or a servo writer of known configuration can be employed as the servo writer. By way of example, known technique such as the technique described in Japanese Unexamined Patent Publication (KOKAI) No. 2011-175687, U.S. Pat. No. 5,689,384, and U.S. Pat. No. 6,542,325, which are expressly incorporated herein by reference in their entirety, can be employed without limitation.

The above-described magnetic tape of an aspect of the present invention has the high surface smoothness of a magnetic layer surface Ra of less than or equal to 1.8 nm and is capable of improving the head positioning precision in a timing based servo system.

Magnetic Tape Device

An aspect of the present invention relates to a magnetic tape device containing the above magnetic tape, a magnetic head, and a servo head.

The details regarding the magnetic tape that is loaded into the above magnetic tape device are as set forth above. A timing based servo pattern is present on such a magnetic tape. Accordingly, in the course of a magnetic head recording a magnetic signal on the data band to form a data track and/or reproducing the signal that has been recorded, it is possible for the magnetic head to follow the data track with high precision by simultaneously having the servo head read the servo pattern and conduct timing based servo type head tracking based on the servo pattern that is being read. The position error signal (PES) that is obtained by the method set forth in Examples further below is an example of an indicator of head positioning precision. The PES is an indicator of the head running while displaced from the position where it should be running even when head tracking is being conducted by a servo system in the course of running a magnetic tape in a magnetic tape device. The higher the value, the greater the displacement and the lower the head positioning precision indicated in the servo system. A magnetic tape according to an aspect of the present invention can achieve, for example, a PES of less than or equal to 9.0 nm (falling within a range of 7.0 nm to 9.0 nm, for example).

A known magnetic head that is capable of recording and/or reproducing magnetic signals on a magnetic tape can be employed as the magnetic head that is mounted on the above magnetic tape device. A single magnetic head can serve as both recording head and reproduction head, or separate magnetic heads can be employed. A known servo head that is capable of reading a timing based servo pattern on the above magnetic tape can be employed as the servo head. At least one, and two or more, servo heads can be contained in the magnetic tape device.

Known technique, including the technique described in. U.S. Pat. Nos. 5,689,384, 6,542,325, and 7,876,521, which are expressly incorporated herein by reference in their entirety, can be applied for details regarding head tracking in a timing based servo system.

Commercial magnetic tape devices are commonly equipped magnetic head(s) and servo head(s) according to standards. Commercial magnetic tape devices are commonly equipped with servo control mechanisms that permit head tracking in timing based servo systems according to standards. A magnetic tape device according to an aspect of the present invention, for example, can be configured by incorporating a magnetic tape according to an aspect of the present invention into a commercial magnetic tape device.

EXAMPLES

The present invention will be described in greater detail below through Examples. However, the present invention is not limited to the embodiments shown in Examples. The "parts" indicated below denotes "weight parts", unless otherwise stated.

Example 1

<Magnetic layer-forming composition>

(Magnetic liquid)
| | |
|---|---|
| Ferromagnetic hexagonal barium ferrite powder: | 100.0 parts |
| (Coercive force Hc: 2,100 Oe (168 kA/m), average particle size 25 nm) | |
| Sulfonic acid group-containing polyurethane resin: | 15.0 parts |
| Cyclohexanone: | 150.0 parts |
| Methyl ethyl ketone: | 150.0 parts |

(Abrasive liquid)
| | |
|---|---|
| α-Alumina (average particle size: 110 nm); | 9.0 parts |
| Vinyl chloride copolymer (MR110 made by Zeon Corp.): | 0.7 part |
| Cyclohexanone: | 20.0 parts |

(Silica gel)
| | |
|---|---|
| Colloidal silica prepared by the silica gel method (average particles size: 120 nm): | 3.5 parts |
| Methyl ethyl ketone: | 8.2 parts |

(Other components)
| | |
|---|---|
| Butyl stearate: | 1.0 part |
| Polyisocyanate (Coronate made by Nippon Polyurethane Industry Co., Ltd.): | 2.5 parts |

(Solvents added to finish)
| | |
|---|---|
| Cyclohexanone: | 180.0 parts |
| Methyl ethyl ketone: | 180.0 parts |

<Nonmagnetic layer-forming composition>

| | |
|---|---|
| Nonmagnetic inorganic powder (α-iron oxide): | 80.0 parts |
| (average particle size: 0.15 μm, average acicular ratio: 7, Brunauer-Emmett-Teller (BET) specific surface area: 52 m²/g) | |
| Carbon black (average particle size: 20 nm): | 20.0 parts |
| Electron beam-curable vinyl chloride copolymer: | 13.0 parts |
| Electron beam-curable polyurethane resin: | 6.0 parts |
| Phenylphosphonic acid: | 3.0 parts |
| Cyclohexanone: | 140.0 parts |
| Methyl ethyl ketone: | 170.0 parts |
| Butyl stearate: | See Table 1 |
| Stearic acid: | See Table 1 |

<Backcoat layer-forming composition>

| | |
|---|---|
| Nonmagnetic inorganic powder (α-iron oxide): | 80.0 parts |
| (average particle size: 0.15 μm, average acicular ratio: 7, BET specific surface area: 52 m²/g) | |
| Carbon black (average article size: 20 nm): | 20.0 parts |
| Carbon black (average particle size: 100 nm): | 3.0 parts |
| Vinyl chloride copolymer: | 13.0 parts |
| Sulfonic acid group-containing polyurethane resin: | 6.0 parts |
| Phenylphosphonic acid: | 3.0 parts |
| Cyclohexanone: | 140.0 parts |
| Methyl ethyl ketone: | 170.0 parts |
| Stearic acid: | 3.0 parts |
| Polyisocyanate (Coronate made by Nippon Polyurethane Industry Co., Ltd.): | 5.0 parts |
| Methyl ethyl ketone: | 400.0 parts |

<Preparation of Various Layer-Forming Compositions>

A magnetic layer-forming composition was prepared by the following method.

The above magnetic liquid was kneaded and dilution processed in an open kneader. A horizontal bead mill disperser was then used to conduct 12 passes of dispersion processing, each pass consisting of a two-minute residence time, at a rotor tip peripheral speed of 10 m/s using zirconia (ZrO₂) beads (referred to as "Zr beads" hereinafter) 0.5 mm in bead diameter at a bead fill rate of 80 volume %.

For the abrasive liquid, the above components were mixed, charged to a vertical sand mill disperser together with Zr beads 1 mm in diameter, adjusted to a bead volume/(abrasive liquid volume +bead volume) of 60%, and sand mill dispersion processed for 180 minutes. The liquid was removed following processing and then processed by ultrasonic dispersion filtration with a flow-type ultrasonic dispersion and filtration device.

The magnetic liquid, silica sol, and abrasive liquid, as well as the other components and the solvents added to finish, were charged to a dissolver-stirrer and stirred for 30 minutes at a peripheral speed of 10 m/s. The mixture was subjected to the number passes of processing indicated in Table 1 in a flow-type ultrasonic disperser at a flow of 7.5 kg/min and filtered with a filter having the pore diameter indicated in Table 1 to prepare a magnetic layer-forming composition.

A nonmagnetic layer-forming composition was prepared by the following method.

The above components, excluding the lubricants (butyl stearate and stearic acid) were kneaded and dilution processed in an open kneader and then dispersion processed in a horizontal bead mill disperser. Subsequently, the lubricants (butyl stearate and stearic acid) were added and the mixture was stirred and mixed in a dissolver-stirrer to prepare a nonmagnetic layer-forming composition.

A backcoat layer-forming composition was prepared by the following method.

The above components, excluding the lubricant (stearic acid), polyisocyanate, and methyl ethyl keto (400.0 parts), were kneaded and dilution processed in an open kneader and then dispersion processed in a horizontal bead mill disperser. Subsequently, the lubricant (stearic acid), polyisocyanate, and methyl ethyl ketone (400.0 parts) were added and the mixture was stirred and mixed in a dissolver-stirrer to prepare a backcoat layer-forming composition.

<Fabrication of Magnetic Tape>

The nonmagnetic layer-forming composition was coated and dried to a dry thickness of 1.00 μm on a polyethylene naphthalate support 6.00 μm in thickness and then irradiated with an electron beam at an acceleration voltage of 125 kV to an energy of 40 kGy. The magnetic layer-forming composition was coated and dried to a dry thickness of 50 nm thereover to form a coating layer of the magnetic layer-forming composition.

Figure 3:
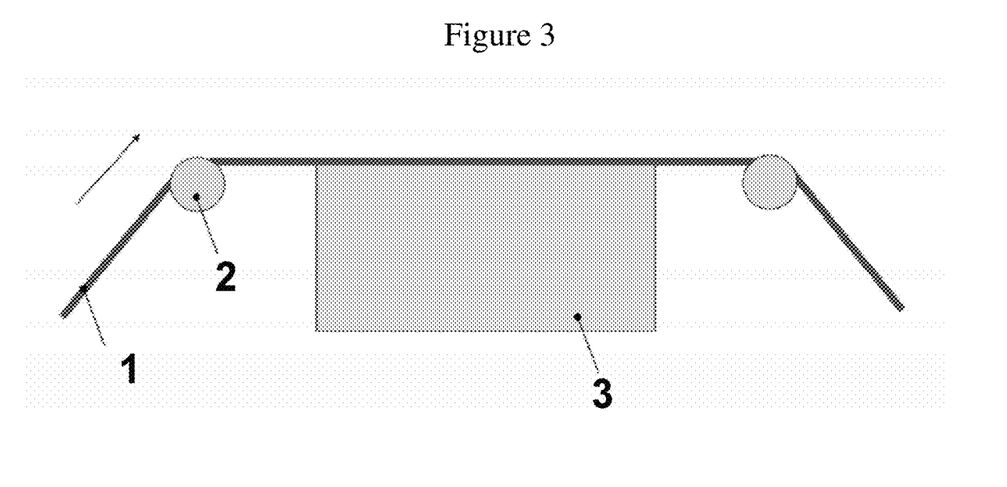
FIG. 3 is a schematic drawing of vibration-imparting device employed in Examples.

Subsequently, the support on which the above coating layer had been formed was placed in the vibration-imparting device shown in FIG. 3 with the surface on the opposite side from the surface on which the coating layer had been formed touching the vibration-imparting unit. The support (numeral 1 in FIG. 3) on which the coating layer had been formed was conveyed at a speed of 0.5 m/sec and vibration was imparted to the coating liquid. In FIG. 3, numeral 2 denotes a guide roller (the numeral 2 has been applied to one of two guide rollers), numeral 3 denotes the vibration-imparting device (vibration-imparting unit containing an ultrasonic vibrator), and the arrow denotes the direction of conveyance. The period from the start of contact by some point on the support on which the coating layer had been formed with the vibration-imparting unit to the end of contact, referred to as the vibration-imparting period, is given in Table 1. The vibration-imparting unit employed was equipped with an internal ultrasonic vibrator. Vibration was imparted using the values of the vibration frequency and intensity of the ultrasonic vibrator that are indicated in Table 1.

Subsequently, the backcoat layer-forming composition was coated and dried to a dry thickness of 0.50 μm on the surface of the nonmagnetic layer on the opposite side from the surface on which the magnetic layer had been formed.

Subsequently, a surface smoothing treatment (calender treatment) was conducted at the calender roll surface temperature given in Table 1 at a linear pressure of 300 kg/cm (294 kN/m) at a rate of 80 m/min with a calender comprised solely of metal rolls. Subsequently, a heat treatment was conducted for 36 hours in an environment with an atmospheric temperature of 70° C. Following the heat treatment, the product was slit to ½ inch (0.0127 meter) width and the surface of the magnetic layer was cleaned with a tape cleaning device mounted such that nonwoven fabric and a razor blade were pressed against the surface of the magnetic layer in an apparatus having a slit product feeding and winding device.

A magnetic tape was thus fabricated.

(Formation of Timing Based Servo Pattern)

With the magnetic layer of the magnetic tape that had been fabricated in a demagnetized state, a servo write head mounted on a servo writer was used to form a servo pattern of layout and shape that were in accordance with the LTO Ultrium format on the magnetic layer. Thus, a magnetic tape was obtained that had data bands, servo bands, and guide bands in a layout in conformity with the LTO Ultrium format on the magnetic layer, and had a servo pattern of a layout and shape in accordance with the LTO Ultrium format on the servo bands.

Example 2 to 6 and Comparative Examples 1 to 10

With the exceptions that the formula of the nonmagnetic layer-forming composition and/or manufacturing conditions given in Table 1 was changed, magnetic tapes were fabricated by the same method as in Example 1. The vibration-imparting time was adjusted by changing the conveyance speed of the support on which the coating layer of the magnetic layer-forming composition had been formed.

[Methods of Evaluating the Physical Properties of the Magnetic Tapes]

<1. Full Width at Half Maximum of Spacing Distribution Before and After Vacuum Heating $FWHM_{before}$, $FWHM_{after}$>

The full width at half maximum of the spacing distribution before and after vacuum heating $FWHM_{before}$ and $FWHM_{after}$ were determined by the following method using a tape spacing analyzer (TSA) (made by Micro Physics Corp.).

A glass sheet provided on the TSA was disposed on the surface of the magnetic layer of the magnetic tape. In this state, a half-sphere made of urethane and provided on the TSA was employed as a pressing member. This half-sphere was pressed with a pressure of $5.05 \times 10^4$ N/m. (0.5 atm) against the surface of the backcoat layer of the magnetic tape. In this state, white light from a stroboscope provided on the TSA was irradiated through the glass sheet onto a certain area (150,000 $\mu m^2$ to 200,000 $\mu m^2$) of the surface of the magnetic layer of the magnetic tape. The reflected light obtained was passed through an interference filter (a filter selectively passing light with a wavelength of 633 nm) and received by a charge-coupled device (CCD) to obtain an interference fringe image produced by protrusions and indentation within this area.

The image was divided into 300,000 points and the distance (spacing) from the surface of the glass sheet on the magnetic tape side to the surface of the magnetic layer of the magnetic tape was determined for each point. These values were plotted as a histogram, the histogram was fit to a Gaussian distribution, and the full width at half maximum obtained was adopted as the fall width at half maximum of the spacing distribution.

Vacuum heating was conducted by storing the magnetic tape for 24 hours in a constant temperature vacuum drier with an internal atmospheric temperature of 70° C. to 90° C. and a degree of vacuum of greater than or equal to 200 Pa and less than or equal to 0.01 MPa.

<2. Difference ($S_{after}-S_{before}$)>

The most frequent value of the histogram before vacuum heating was subtracted from the most frequent value of the histogram after vacuum heating obtained in 1, above to obtain the difference ($S_{after}-S_{before}$).

<3. Magnetic Layer Surface Ra>

An atomic force microscope (AFM, Nanoscope 4 made by Veeco) was employed to measure a 40 $\mu m \times 40$ $\mu m$ measurement area, and the centerline average surface roughness Ra was obtained on the surface of the magnetic layer of the magnetic tape. The scan rate (probe displacement speed) was 40 $\mu m/s$, and the resolution was 512 pixels×512 pixels.

[Methods of Evaluating Performance of the Magnetic Tapes]

<1. PES Measurement>

The servo pattern on the magnetic tape on which the above timing based servo pattern had been formed was read with a verify head on a servo writer which was employed for forming the servo pattern. The verify head was a reading-use magnetic head for verifying the quality of servo patterns formed on magnetic tapes. In the same manner as a magnetic head on a known magnetic tape device (drive), elements were disposed on it to read positions corresponding to servo pattern positions (positions in the direction of width of the magnetic tape).

A known PES calculation circuit that calculated the head positioning precision in a servo system as a PES from the electrical signal obtained by reading the servo pattern with the verify head was connected to the verify head. The PES calculation circuit calculated as needed the displacement in the direction of width of the magnetic tape from an electrical signal (pulse signal) that was inputted, and calculated the PES as the value obtained by applying a high-pass filter (cutoff: 500 cycles/m) to the time change information (signal) of this displacement.

<2. Evaluation of Electromagnetic Characteristics (Signal-to-Noise Ratio (SNR))>

As set forth above, a signal was recorded at a linear recording density of 325 kfci on the magnetic tapes fabricated as set forth above in an environment with an atmospheric temperature of 23° C.±1° C. and 50% relative humidity with a loop tester on which had been mounted a metal-in-gap (MIG) recording head (gap length 0.15 $\mu m$, 1.8 T) and a reproduction-use giant magnetoresistive (GMR) head (reproduction track width: 1 $\mu m$). Subsequently, the reproduction output was measured and the SNR was calculated as the ratio of the reproduction output to the noise. When the SNR of Comparative Example 1 was adopted as 0.0 dB, an SNR of greater than or equal to 2.0 dB was evaluated as affording performance that would be capable of responding to the stringent future needs of higher density recording.

The results of the above are given in Table 1.

TABLE 1

|  |  | Unit | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Nonmagnetic layer-forming composition | Content of butyl stearate | part | 2.0 | 2.0 | 2.0 | 2.0 | 2.0 | 2.0 |
|  | Content of stearic acid | part | 1.0 | 1.0 | 1.0 | 1.0 | 1.0 | 1.0 |

TABLE 1-continued

| | | Unit | | | | | | |
|---|---|---|---|---|---|---|---|---|
| Calender processing condition | Calender roll surface temp. | ° C. | 80 | 90 | 95 | 100 | 110 | 100 |
| Ultrasonic vibration imparting condition | Vibration imparting period | sec. | Not conducted | Not conducted | Not conducted | Not conducted | Not conducted | Not conducted |
| | Vibration frequency | kHz | | | | | | |
| | Intensity | W | | | | | | |
| Preparation condition of magnetic layer-forming composition | Number of passes in flow-type ultrasonic disperser | Times | 1 | 1 | 1 | 1 | 1 | 2 |
| | Number of times filtration was conducted | Times | 1 | 1 | 1 | 1 | 1 | 1 |
| | Pore diameter of filter | μm | 1.0 | 1.0 | 1.0 | 1.0 | 1.0 | 1.0 |
| Magnetic layer surface Ra | | nm | 2.5 | 2.2 | 2.0 | 1.8 | 1.5 | 1.8 |
| Safter-Sbefore | | nm | 2.9 | 3.1 | 3.1 | 2.3 | 3.0 | 3.0 |
| FWHMbefore | | nm | 9.9 | 9.3 | 8.8 | 8.7 | 8.2 | 8.6 |
| FWHMafter | | nm | 10.0 | 9.5 | 9.1 | 8.5 | 8.0 | 6.8 |
| PES | | nm | 8.6 | 8.7 | 8.9 | 19.6 | Measurement was impossible. | 19.8 |
| SNR | | dB | 0.0 | 0.7 | 1.5 | 2.0 | 2.5 | 2.3 |

| | | Unit | Comp. Ex. 7 | Comp. Ex. 8 | Comp. Ex. 9 | Comp. Ex. 10 | Ex. 1 |
|---|---|---|---|---|---|---|---|
| Nonmagnetic layer-forming composition | Content of butyl stearate | part | 2.0 | 10.0 | 0.0 | 2.0 | 2.0 |
| | Content of stearic acid | part | 1.0 | 1.0 | 1.0 | 2.0 | 1.0 |
| Calender processing condition | Calender roll surface temp. | ° C. | 100 | 100 | 100 | 100 | 100 |
| Ultrasonic vibration imparting condition | Vibration imparting period | sec. | 0.5 | 0.5 | Not conducted | Not conducted | 0.5 |
| | Vibration frequency | kHz | 30 | 30 | | | 30 |
| | Intensity | W | 100 | 100 | | | 100 |
| Preparation condition of magnetic layer-forming composition | Number of passes in flow-type ultrasonic disperser | Times | 1 | 2 | 1 | 1 | 2 |
| | Number of times filtration was conducted | Times | 1 | 1 | 1 | 1 | 1 |
| | Pore diameter of filter | μm | 1.0 | 1.0 | 1.0 | 1.0 | 1.0 |
| Magnetic layer surface Ra | | nm | 1.8 | 1.8 | 1.8 | 1.8 | 1.8 |
| Safter-Sbefore | | nm | 3.1 | 11.0 | 0 | 2.8 | 3.1 |
| FWHMbefore | | nm | 6.9 | 7.0 | — | 8.6 | 7.0 |
| FWHMafter | | nm | 8.4 | 7.0 | — | 8.6 | 6.9 |
| PES | | nm | 19.3 | Measurement was impossible. | Measurement was impossible. | 19.4 | 8.2 |
| SNR | | dB | 2.1 | 2.0 | 2.1 | 2.0 | 2.0 |

| | | Unit | Ex. 2 | Ex. 3 | Ex. 4 | Ex. 5 | Ex. 6 |
|---|---|---|---|---|---|---|---|
| Nonmagnetic layer-forming composition | Content of butyl stearate | part | 6.0 | 2.0 | 2.0 | 2.0 | 2.0 |
| | Content of stearic acid | part | 1.0 | 1.0 | 1.0 | 1.0 | 1.0 |
| Calender processing condition | Calender roll surface temp. | ° C. | 100 | 100 | 105 | 105 | 110 |
| Ultrasonic vibration imparting condition | Vibration imparting period | sec. | 0.5 | 3.0 | 0.5 | 3.0 | 3.0 |
| | Vibration frequency | kHz | 30 | 30 | 30 | 30 | 30 |
| | Intensity | W | 100 | 100 | 100 | 100 | 100 |
| Preparation condition of magnetic layer-forming composition | Number of passes in flow-type ultrasonic disperser | Times | 2 | 30 | 2 | 30 | 30 |
| | Number of times filtration was conducted | Times | 1 | 5 | 1 | 5 | 5 |
| | Pore diameter of filter | μm | 1.0 | 0.5 | 1.0 | 0.5 | 0.5 |
| Magnetic layer surface Ra | | nm | 1.8 | 1.8 | 1.6 | 1.6 | 1.5 |
| Safter-Sbefore | | nm | 7.4 | 2.9 | 2.9 | 3.0 | 3.1 |
| FWHMbefore | | nm | 6.9 | 4.1 | 7.0 | 4.1 | 3.9 |
| FWHMafter | | nm | 6.9 | 4.0 | 6.9 | 3.9 | 4.0 |
| PES | | nm | 8.2 | 7.8 | 3.4 | 7.7 | 7.9 |
| SNR | | dB | 2.1 | 2.1 | 2.4 | 2.6 | 2.5 |

The fact that the PES determined by the above method was less than or equal to 9.0 nm means that the recording head can be positioned with high precision by head tracking in a timing based support system.

Based on a comparison of Comparative Examples 1 to 3 and Examples 4, 6, 7, and 10, the phenomenon (drop in head positioning precision) of a PES greatly exceeding 9.0 nm was confirmed to occur in magnetic tapes with a magnetic layer surface Ra of less than or equal to 1.8 nm.

By contrast, each of the magnetic tapes of Examples 1 to 6, despite having a magnetic layer surface Ra of less than or equal to 1.8 nm, achieved a PES of less than or equal to 9.0 nm, that is, permitted improved head positioning in a timing based servo system.

PES evaluation was not possible for magnetic tapes of Comparative Examples 5 and 8 because sticking of the servo head and the surface of the magnetic layer occurred, precluding running of the servo head. PES evaluation was not possible for the magnetic tape of Comparative Example 9 because no servo signal output could be obtained from the servo head due to the effects of deposits adhering to the servo head. The surface of the magnetic layer of the magnetic tape of Comparative Example 9 after the attempt at PES evaluation was observed under an optical microscope, revealing scratching. Thus, the deposits were attributed to shavings generated by shaving of the surface of the magnetic layer through contact with the servo head.

The facts that the magnetic layer surface Ra was less than or equal to 1.8 nm and thus the surface smoothness of the magnetic layer was high were thought to contribute to the magnetic tapes of Examples 1 to 6 exhibiting SNRs that were greater than or equal to 2.0 dB.

An aspect of the present invention is useful in the technical field of magnetic tapes for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises a magnetic layer comprising ferromagnetic powder and binder on a nonmagnetic support, wherein
a timing base servo pattern is present on the magnetic layer;
a centerline average surface roughness Ra that is measured on a surface of the magnetic layer is less than or equal to 1.8 nm;
the magnetic layer contains a fatty acid ester;
a full width at half maximum of a spacing distribution measured by optical interferometry on the surface of the magnetic layer before vacuum heating the magnetic tape is greater than 0 nm but less than or equal to 7.0 nm;
a full width at half maximum of a spacing distribution measured by optical interferometry on the surface of the magnetic layer after vacuum heating the magnetic tape is greater than 0 nm but less than or equal to 7.0 nm; and
a difference, $S_{after}-S_{before}$, of a spacing $S_{after}$ measured by optical interferometry on the surface of the magnetic layer after vacuum heating the magnetic tape and a spacing $S_{before}$ measured by optical interferometry on the surface of the magnetic layer before vacuum heating the magnetic tape is greater than 0 nm but less than or equal to 8.0 nm.

2. The magnetic tape according to claim 1,
wherein the centerline average surface roughness Ra that is measured on the surface of the magnetic layer is greater than or equal to 1.2 nm but less than or equal to 1.8 nm.

3. The magnetic tape according to claim 1,
wherein the centerline average surface roughness Ra that is measured on the surface of the magnetic layer is greater than or equal to 1.2 nm but less than or equal to 1.6 nm.

4. The magnetic tape according to claim 1,
wherein the difference, $S_{after}-S_{before}$, is greater than 0 nm but less than or equal to 7.5 nm.

5. The magnetic tape according to claim 1,
wherein the full width at half maximum of the spacing distribution that is measured by optical interferometry on the surface of the magnetic layer before vacuum heating the magnetic tape is greater than 0 nm but less than or equal to 5.0 nm.

6. The magnetic tape according to claim 1,
wherein the full width at half maximum of the spacing distribution that is measured by optical interferometry on the surface of the magnetic layer after vacuum heating the magnetic tape is greater than 0 nm but less than or equal to 5.0 nm.

7. The magnetic tape according to claim 1,
wherein the magnetic layer comprises nonmagnetic filler.

8. The magnetic tape according to claim 7,
wherein the nonmagnetic filler is colloidal particles.

9. The magnetic tape according to claim 8,
wherein the colloidal particles are silica colloidal particles.

10. The magnetic tape according to claim 1,
which comprises a nonmagnetic layer comprising nonmagnetic powder and binder between the nonmagnetic support and the magnetic layer.

11. A magnetic tape device,
which comprises a magnetic tape, a magnetic head and a servo head, wherein
the magnetic tape is a magnetic tape which comprises a magnetic layer comprising ferromagnetic powder and binder on a nonmagnetic support, wherein
a timing base servo pattern is present on the magnetic layer;
a centerline average surface roughness Ra that is measured on a surface of the magnetic layer is less than or equal to 1.8 nm;
the magnetic layer contains a fatty acid ester;
a full width at half maximum of a spacing distribution measured by optical interferometry on the surface of the magnetic layer before vacuum heating the magnetic tape is greater than 0 nm but less than or equal to 7.0 nm;
a full width at half maximum of a spacing distribution measured by optical interferometry on the surface of the magnetic layer after vacuum heating the magnetic tape is greater tan 0 nm but less than or equal to 7.0 nm; and
a difference, $S_{after}-S_{before}$, of a spacing $S_{after}$ measured by optical interferometry the surface of the magnetic layer after vacuum heating the magnetic tape and a spacing $S_{before}$ measured by optical interferometry on the surface of the magnetic layer before vacuum heating the magnetic tape is greater than 0 nm but less than or equal to 8.0 nm.

12. The magnetic tape device according to claim 11,
wherein the centerline average surface roughness Ra that is measured on the surface of the magnetic layer is greater than or equal to 1.2 nm but less than or equal to 1.8 nm.

13. The magnetic tape device according to claim 11, wherein the centerline average surface roughness Ra that is measured on the surface of the magnetic layer is greater than or equal to 1.2 nm but less than or equal to 1.6 nm.

14. The magnetic tape device according to claim 11, wherein the difference, $S_{after}-S_{before}$, is greater than 0 nm but less than or equal to 7.5 nm.

15. The magnetic tape device according to claim 11, wherein the full width at half maximum of the spacing distribution that is measured by optical interferometry on the surface of the magnetic layer before vacuum heating the magnetic tape is greater than 0 nm but less than or equal to 5.0 nm.

16. The magnetic tape device according to claim 11, wherein the full width at half maximum of the spacing distribution that is measured by optical interferometry on the surface of the magnetic layer after vacuum heating the magnetic tape is greater than 0 nm but less than or equal to 5.0 nm.

17. The magnetic tape device according to claim 11, wherein the magnetic layer comprises nonmagnetic filler.

18. The magnetic tape device according to claim 17, wherein the nonmagnetic filler is colloidal particles.

19. The magnetic tape device according to claim 18, wherein the colloidal particles are silica colloidal particles.

20. The magnetic tape device according to claim 11, wherein the magnetic tape comprises a nonmagnetic layer comprising nonmagnetic powder and binder between the nonmagnetic support and the magnetic layer.

\* \* \* \* \*